March 1, 1927.

J. H. COLLINS 1,619,700

PUMP ROD ROTATING DEVICE

Filed Feb. 26, 1924

INVENTOR.
JAMES H. COLLINS
BY
Edmund A. Munro
ATTORNEY.

Patented Mar. 1, 1927.

1,619,700

UNITED STATES PATENT OFFICE.

JAMES H. COLLINS, OF FULLERTON, CALIFORNIA, ASSIGNOR TO WILLIAM D. SHAFFER, OF BREA, CALIFORNIA.

PUMP-ROD-ROTATING DEVICE.

Application filed February 26, 1924. Serial No. 695,285.

My invention relates to rotors for rotating pump rods and particularly sucker rods and plungers used in oil wells.

It has been found advantageous to rotate the sucker rods and plunger used in pumping oil wells, for the reason that such rotation causes the rods and connections to wear more evenly and prevents the same from unscrewing.

It is however, necessary that a device for rotating such rods be not operated positively, for otherwise if the rods should, for any reason become stuck, considerable damage might be done by a forced turning.

The general object of my invention is to provide a device for yieldingly rotating pump rods to cause the rods and their connections to wear more evenly, to prevent the same from unscrewing and to prevent breakage of the rods and other damage, from a forced turning.

Figure 1:
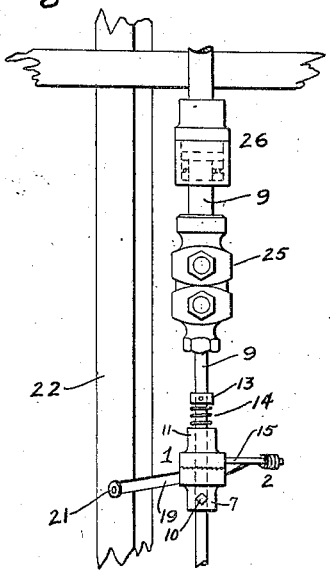
Fig. 1 is a side elevation of my rotor shown mounted on a sucker rod of an oil well with associated parts of an oil well apparatus.
Figure 2:
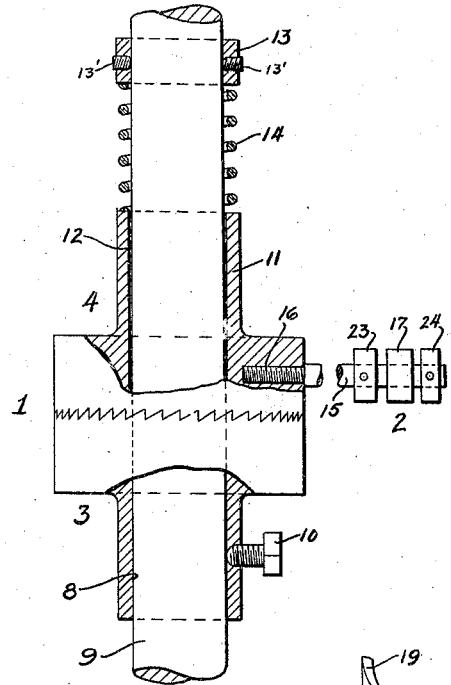
Fig. 2 is an enlarged partial section and partial elevation of my rotor mounted on an oil well sucker rod with the clutch thereof closed.
Figure 3:
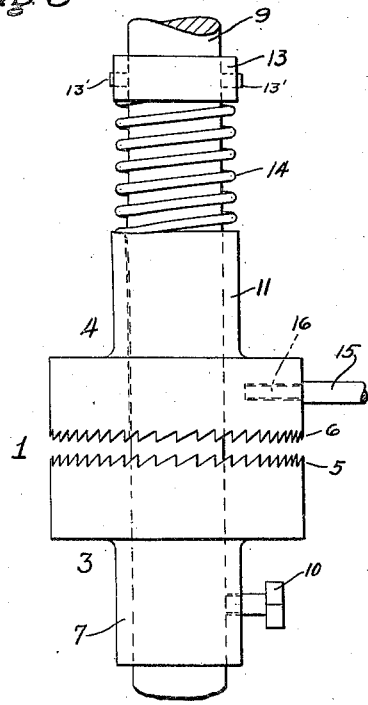
Fig. 3 is an enlarged side elevation of my rotor mounted on a sucker rod with the clutch open.
Figure 4:
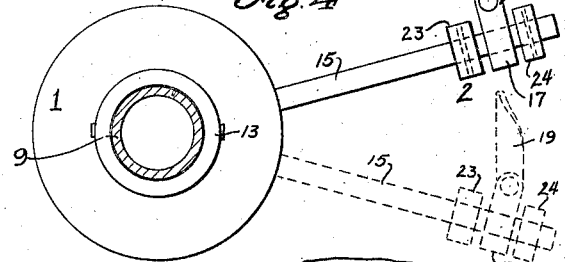
Fig. 4 is a plan view of my rotor indicating in dotted lines the movement of the mechanism for oscillating the movable clutch member on a reciprocation of the pump rods.
Figure 5:
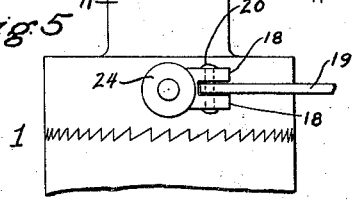
Fig. 5 is a fragmentary elevation of my rotor showing the rotating means therefor.

My rotor comprises a clutch 1 and a rotating device 2. The clutch 1 comprises a pair of clutch members 3 and 4 which are preferably provided with interengaging teeth 5 and 6 on their adjacent faces. The member 3 is formed with an axial depending sleeve 7 and is provided with an axial bore 8 extending therethrough, through which bore a polish rod 9 is extended and the member is secured on said rod by a set screw 10 seated in said sleeve. The member 4 is formed with an axial upstanding sleeve 11 and is provided with an axial bore 12 extending therethrough, through which bore the polish rod 9 is loosely extended so that the member may reciprocate and turn on said rod. A collar 13 is adjustably secured on the polish rod 9 above the upper end of sleeve 11 by set screws 13', a coil spring 14 surrounds the polish rod, bearing at its ends against the upper end of said sleeve and said collar respectively, whereby the clutch member is held down and its teeth 6 maintained in engagement with the teeth 5 of the lower clutch member 3.

A pin 15 has its inner end 16 threaded and screw seated in the head of the upper clutch member 4, with the pin extending radially from the clutch member. A toggle collar 17 is loosely mounted on the outer portion of pin 15, which collar is formed with a pair of superimposed knuckles 18 between which one end of a link 19 is pivotally connected by a pin 20 extending through the knuckles and the end of the link, the other end of link 19 being pivotally connected by a pin 21 to the headache post 22 on an oil well derrick, so that the link may swing vertically. A pair of collars 23 and 24 are secured on the pin at opposite sides respectively of the collar 17, whereby the collar 17 is maintained in position at any point on the pin.

The polish rod 9 is suspended from the walking beam of the oil well derrick by means of a gripping device 25, and an adjuster (not shown). Between the gripping device and adjuster the polish rod is separated and the separated parts of the rod are connected together by a ball bearing swivel 26 which allows the rod therebelow to be turned with as little friction as possible.

As the walking beam moves up and down and reciprocates the polish rod 9, the link 19 oscillates the upper clutch member 4 through the medium of arm 15, so that when said clutch member is turned by said link counter clockwise with relation to said rod on the upward movement of the rod, the teeth 6 of said member escape the teeth 5 of clutch member 3, and no rotation of the rod takes place, and when the clutch member 4 is turned clockwise on the downward movement of the rod the teeth 6 of said member engage the teeth 5 of the lower clutch member 3 and turn said member and the polish rod correspondingly, thus causing the rod and connections to wear evenly, the ball bearing swivel 26 enabling the rod to be easily turned.

If for any reason the rods do not turn easily, the inherent resiliency of the connected sucker rod sections will hold the two clutch members 3 and 4 together, and the rod sections thereby will not be turned, this action being permitted by the spring 14, set collar 13, and by the ball swivel bearing 26.

What I claim is:

1. In combination a polished rod, a clutch, one member of said clutch being fixed to the polished rod of an oil well apparatus, the other member of said clutch being rotatably mounted on said rod, means for oscillating said rotatable clutch member as said rod reciprocates to cause said clutch members to disengage on one reciprocating movement of the rod and to engage and turn the rod on its other reciprocating movement, and spring means for forcing said rotatably mounted clutch member toward said fixed clutch member.

2. In combination a polished rod, a clutch, one member of said clutch being fixed on said polished rod, the other clutch member being loosely mounted on said rod, a pin projecting from the side of said loosely mounted clutch member, and a link connected at one end to said pin and at its other end to a part of the well derrick structure for causing said clutch members to engage on one stroke of the polished rod for turning said rod.

3. In combination a polished rod, a clutch, one member of said clutch being fixed to said polished rod, the other clutch member being rotatably mounted thereon, interengaging teeth on said clutch members, and link means connected at one end to the rotatably mounted clutch member and its other end to a stationary object for rotating said mounted clutch member and causing the teeth of both clutch members to engage on one stroke of the rod to rotate said rod.

4. A device of the class described, comprising a polished rod swivelly mounted, a two part clutch mounted on said rod, one of said clutch members being rigidly secured thereto, and a link pivotally secured at one end to a stationary object and at its other end to the movable clutch member, whereby when the rod is reciprocated the clutch members will engage to positively turn the same in a single direction.

5. In combination, a polished rod, means for reciprocating said rod, a swivel bearing connecting the upper end of said rod and said reciprocating means, a clutch mechanism on said rod, one member of said clutch being fixed on said rod, the other clutch member being loose on said rod, means for oscillating said loose clutch member to rotate said rod as said rod is reciprocated, and means for holding said clutch member in engagement at all times when said rod resists a turning movement.

In witness that I claim the foregoing I have hereunto subscribed my name this 18th day of February, 1924.

JAMES H. COLLINS.